United States Patent [19]

Kasuga et al.

[11] Patent Number: 4,998,802

[45] Date of Patent: Mar. 12, 1991

[54] OBJECTIVE LENS DRIVING DEVICE IN AN OPTICAL PICKUP

[75] Inventors: Ikuo Kasuga; Toru Kamada; Fumio Kobayashi, all of Komagane, Japan

[73] Assignee: Kabushiki Kaisha Sankyo Seiki Seisakusho, Nagano, Japan

[21] Appl. No.: 357,314

[22] Filed: May 25, 1989

[30] Foreign Application Priority Data

Jun. 3, 1988 [JP] Japan ................................. 63-136780
Jun. 16, 1988 [JP] Japan ................................. 63-148463
Jun. 23, 1988 [JP] Japan ................................. 63-155473

[51] Int. Cl.$^5$ ................................................ G02B 7/02
[52] U.S. Cl. ..................................... 350/247; 350/255; 369/44.22
[58] Field of Search .................... 350/247, 255, 257; 369/44, 45, 46, 44.22

[56] References Cited

U.S. PATENT DOCUMENTS

| | | | |
|---|---|---|---|
| 4,664,476 | 5/1987 | Kasuga | 350/247 |
| 4,752,117 | 6/1988 | Ichikawa et al. | 350/247 |
| 4,759,005 | 7/1988 | Kasahara | 350/255 |
| 4,861,138 | 8/1989 | Suzuki | 350/255 |

*Primary Examiner*—Bruce Y. Arnold
*Assistant Examiner*—Loha Ben
*Attorney, Agent, or Firm*—Flynn, Thiel, Boutell & Tanis

[57] ABSTRACT

An objective lens driving device is disclosed, in which the objective lens is moved in the direction of the optical axis thereof by a thrusting force generated between a magnet for focusing and a driving coil for focusing to effect focusing and it is moved in the direction perpendicular to that of the optical axis thereof by another thrusting force generated between a magnet for tracking and a driving coil for tracking to effect tracking.

18 Claims, 8 Drawing Sheets

FOCUS        TRACKING

OBJECTIVE LENS DRIVING DEVICE IN AN OPTICAL PICKUP

FIELD OF THE INVENTION

This invention relates to an objective lens driving device in an optical pickup used in an optical disk device, etc.

BACKGROUND OF THE INVENTION

In an optical disk device using an optical disk as a recording medium an optical pickup is used for reading out information pits, by means of which information signals are written-in on the disk. In such an optical pickup it is necessary to focus precisely a laser beam to these information pits on the disk. For this purpose, an objective lens driving device is used, which moves an objective lens two-dimensionally in the direction of the optical axis, i.e. according to a focusing signal, and in the tracking direction against deviations or oscillation of the disk. Various properties required to this objective lens driving device are: (1) to have a high sensitivity; (2) to be excellent in dynamic characteristics such as the ability of following in a high frequency region; (3) to be of small size; (4) to be cheap, etc.

FIGS. 16 to 22 illustrate examples of various sorts of prior art objective lens driving devices.

Figure 16:
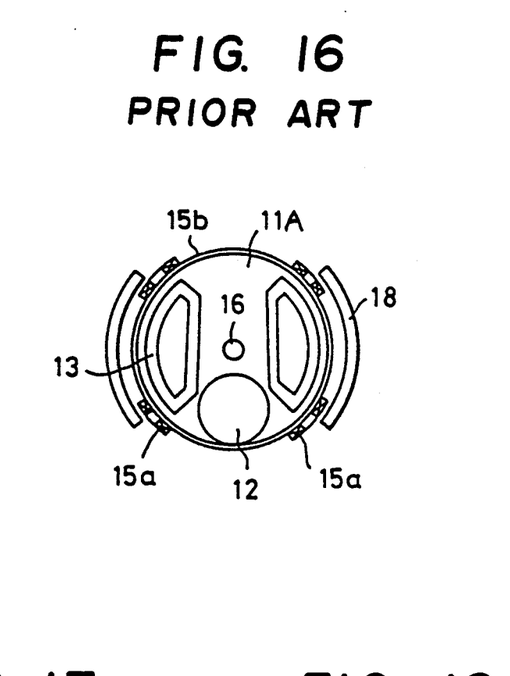
FIG. 16 is a plan view illustrating an example of the prior art objective lens driving device.

In the example indicated in FIG. 16, an objective lens 12 is mounted on a lens holder 11A, which is rotatable around a journal 16 and movable in the direction of the journal 16 and a driving coil for focusing 15b is wound in the form of, a cylinder on the outer periphery of the lens holder 11A. Further, four rectangular driving coils for tracking 15a are secured to the outer periphery thereof. They are arranged so that one side of each of the driving coils for tracking 15a is located within a magnetic circuit including an inner and an outer core 13 and 18.

Figure 17:
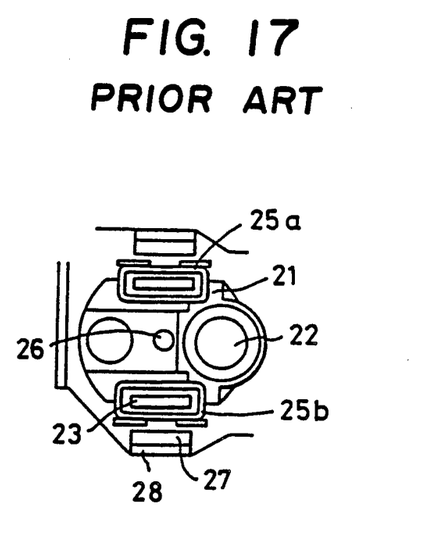
FIG. 17 is a plan view illustrating another example of the prior art objective lens driving device.

In the example indicated in FIG. 17, an objective lens 22 is mounted on a lens holder 21, which is rotatable around a journal 26 and movable in the direction of the journal 26 and at the same time a pair of rectangular-tube-shaped driving coils for focusing coil 25b are mounted at symmetrical positions, putting the journal 26 therebetween. Further, two rectangular driving coils for tracking coil 25a are mounted on the outer side surface of each of the coils 25b. They are arranged so that one side of each of the coils 25a is located within a magnetic circuit including an inner and an outer core 23 and 28 as will as a magnet 27.

Figure 18:
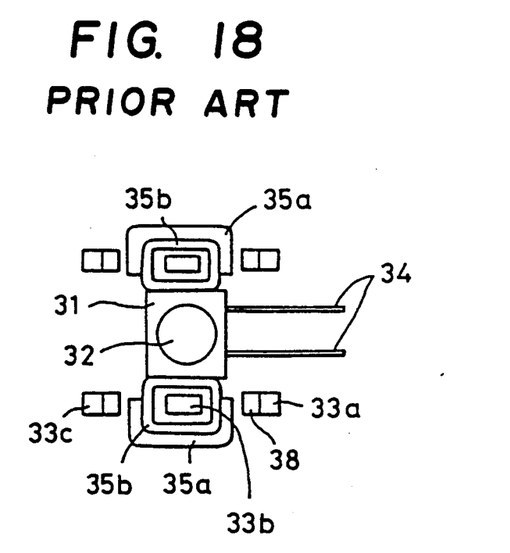
FIG. 18 is a plan view illustrating still another example of the prior art objective lens driving device.
Figure 19:
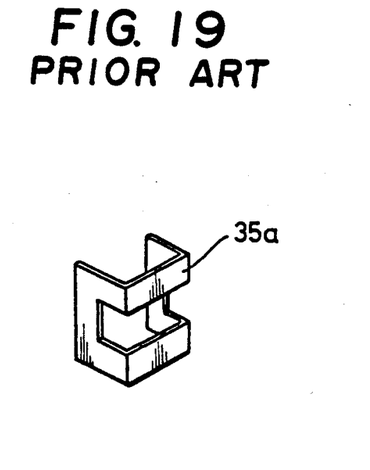
FIG. 19 is a perspective view illustrating a driving coil for tracking used in the prior art examples.
Figure 20:
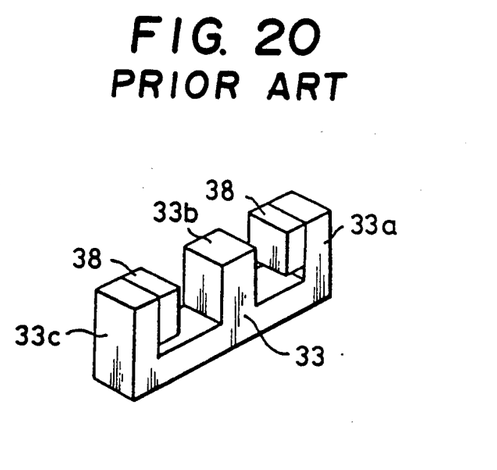
FIG. 20 is a perspective view illustrating a yoke constituting a magnetic circuit in the prior art examples.

In the example indicated in FIGS. 18 to 20, an objective lens 32 is mounted at the center of a rectangular pillar shaped lens holder 31 and at the same time a rectangular-tube-shaped driving coil for focusing 35b is mounted on each of the two side surfaces thereof, which are parallel to each other. Further, a driving coil for tracking 35a formed by bending a coil formed in the shape of a rectangle in a U-shape is mounted so as to enclose about a half of the outer side surface of each of the coils 35b, as indicated in FIG. 19. The lens holder 31 stated above is supported movably in the direction of the optical axis of the objective lens 32 and in the direction perpendicular to the first by means of a parallel spring 34. A magnetic circuit is constituted by a yoke 33 having two protrusions 33a, 33c on the two side surfaces, a central protrusion 33b and a magnet 38 secured to the inner side surface of each of the protrusions 33a, 33c as indicated in FIG. 20, and so constructed that the central protrusion 33b stated above is located at the center of the coil 35b so that the magnetic flux traverses two sides of each of the coils 35b, 35a.

Figure 21:
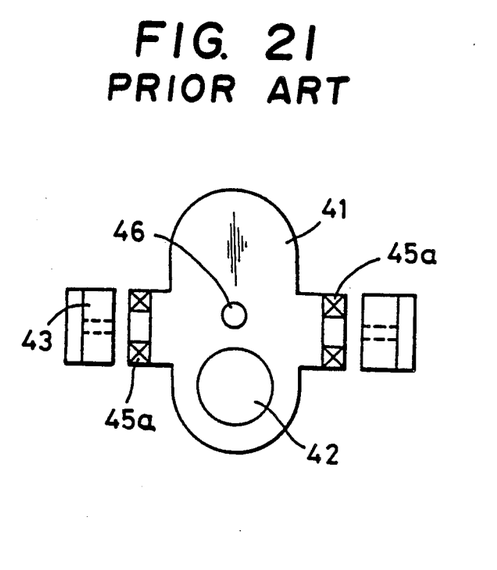
FIG. 21 is a plan view illustrating still another example of the prior art objective lens driving device.
Figure 22:
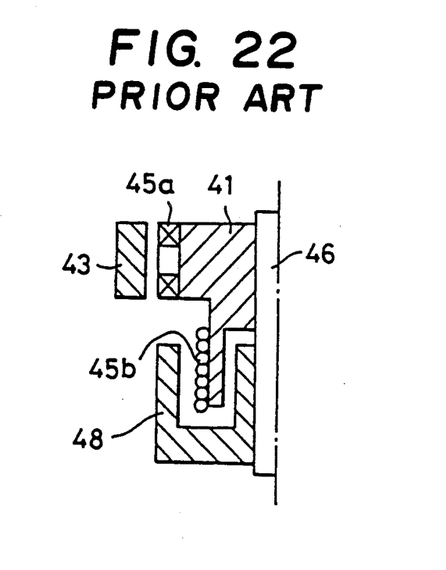
FIG. 22 is a longitudinal cross-sectional view of the same prior art example.

In the example indicated in FIGS. 21 and 22, an objective lens 42 is mounted on a lens holder 41, which is rotatable around the journal 46 and movable along the journal 46, and at the same time a pair of driving coils for tracking 45a are mounted on both the sides thereof. Further, a cylindrical driving coil for focusing 45b is mounted under this coil 45a so as to enclose the journal 46. A magnetic circuit for tracking 43 is constituted by a yoke and a magnet disposed opposite to the coil 45a stated above and on the other hand a magnetic circuit for focusing 48 is constituted by a yoke and a magnet disposed opposite to the coil 45b stated above.

Figure 23A:
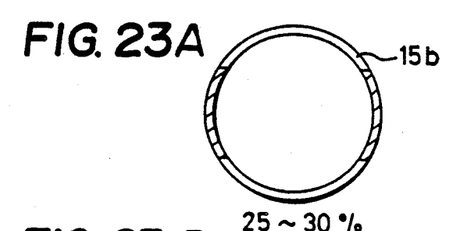
FIGS. 23A to 23E and 23a to 23e are schemes for comparison showing the utilization efficiency of the coils for focusing and for tracking, respectively, used in the prior art examples and those used in the embodiments of this invention, comparing them with each other.
Figure 23B:
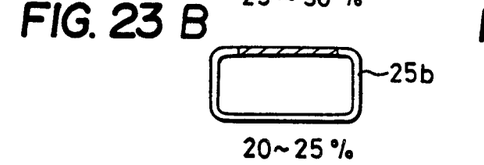
Figure 23C:
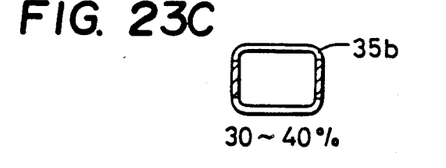

In FIGS. 23A to 23D and 23a to 23d, the utilization efficiency of the driving coil for focusing and the driving coil for tracking in the prior art objective lens driving device described above, i.e. the ratio of the length of the portion, on which the thrusting force acts effectively, to the total length of the coil, is indicating by hatching. FIGS. 23A and 23a correspond to FIG. 16; FIGS. 23B and 23b to FIG. 17; and FIGS. 23C and 23c to FIGS. 18 to 20. As it can be seen from these figures, according to the three prior art examples indicated in FIGS. 16 to 20, since the ratio of the portion, in which each of the coils generates effectively the driving force, is small, they have a problem that the utilization efficiency is low and the sensitivity is low. In addition, in these examples, since the magnet is used in common by winding the driving coils for focusing and for tracking, superposed on each other in the magnetic gap, at the first glance it seems that they have a tendency towards a higher efficiency. However, in reality, since the coils are wound, superposed on each other, the magnetic gap is enlarged and the magnetic flux density within the gap is lowered. Therefore, the size of the efficiency is cancelled and the superposed winding of the coils does not contribute largely to the rise of the efficiency.

Figure 23D:
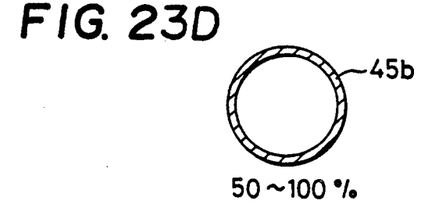

Contrarily thereto, according to the prior art example indicated in FIGS. 21 and 22, since there are disposed separately magnetic circuits used exclusively for focusing and for tracking, respectively, as indicated in FIGS. 23D and 23d, the utilization efficiency of each of the driving coil is high and therefore a high performance objective lens driving device can be expected. However, since the magnetic circuits are used exclusively for focusing and for tracking separately, the cost therefor is high. Further, it is difficult to dispose a counter yoke on the lens holder side in the magnetic circuit for tracking. Therefore, in reality the magnetic flux density in the coil portion is low and the efficiency is not always high.

As described above, in an objective lens driving device in the optical pickup used in an optical disk device, etc. it is necessary to control the position of the objective lens with a high precision two-dimensionally in the focusing direction and the tracking direction. In order to effect this two-dimensional following servo, the structure for holding the objective lens at a predetermined neutral point is an important factor determining the performance of the optical pickup.

Structure for supporting the objective lens in prior art objective lens driving devices can be classified roughly into two categories with respect to the method, by which the objective lens is held at the predetermined neutral point, one of them using a metallic plate spring and in the other an elasticity holding damper such as a molded spring being combined with the supporting journal. The former can be used in common for positioning the lens and for holding the elasticity. However, it is apt to give rise to extraordinary resonance due to slight distortion of the plate spring or to be instable because of insufficiency of the braking property at the resonance and in addition it is difficult to locate the optical axis of the lens with a high precision. For the latter, although it is each to locate the optical axis with a high precision by means of the supporting journal, since most of the elastic members combined therewith are molded products made of rubber, resin, etc., it is disadvantageous in view of temperature characteristics or changes with the passage of time and at the same time, since the size of the spring is reduced together with the reduction of the size of the device, it has a problem that the region, where the characteristics are linear, becomes narrower and that the follow-up property is worsened for disks having a large surface oscillation or excentricity.

Consequently, in order to solve these problematical points, several propositions have been done, by which the objective lens is held at the neutral point by making it have a magnetic restoring force. Several examples thereof are those described in JP-Utility Model-A-58-179635, JP-Utility Model A-58-163908 and JP-A-62-141646.

In the objective lens driving device described above, in which the objective lens has an elastic restoring force, the region where the elastic restoring force is uniform is narrow, and in order to remedy it, improvement is necessary to use a plurality of magnetic pieces, etc. Further, holding of the neutral point by means of a magnetic piece is efficient for either one of the focusing direction and the tracking direction. Therefore, it has a problem that a pair of magnetic pieces are necessary and the construction is complicated, which raises the cost, if it is intended to have a neutral point in both the directions, i.e. focusing direction and tracking direction.

OBJECT OF THE INVENTION

This invention has been done, on order to solve these problems of the prior art techniques and a first object of this invention is to provide an objective lens driving device, which is small, has a high efficiency and in addition can be realized by using a small number of parts so that fabrication cost is low and reliability is high.

A second object of this invention is to provide an objective lens driving device obtaining the neutral point by using the magnetic restoring force, in which the two-dimensional restoring force is produced both in the focusing direction and in the tracking direction by using a set of magnetic pieces so that it is possible to obtain the neutral point two-dimensionally and which is, in this way, not expensive and has a high reliability.

SUMMARY OF THE INVENTION

In order to achieve the above objects, an objective lens driving device in an optical pickup according to this invention is characterized in that it comprises a magnet for focusing and a magnet for tracking, magnetized so as to be polarized in two directions, which are arranged on a continuous common surface and perpendicular to each other, and a driving coil for focusing and a driving coil for tracking, which are arranged on a common surface so as to be opposite to the magnet for focusing and the magnet for tracking stated above, respectively, wherein the objective lens is moved in the direction of the optical axis thereof by the thrusting force generated between the magnet for focusing and the driving coil for focusing described above and in the direction perpendicular to the optical axis thereof by the thrusting force generated between the magnet for tracking and the driving coil for tracking described above.

DETAILED DESCRIPTION

Hereinbelow, an embodiment of the objective lens driving device according to this invention will be explained, referring to FIGS. 1 to 12.

In FIGS. 1 to 4, reference numeral 1 represents a lens holder, which is supported by a journal 7, rotatably around it and movably along it. An objective lens 2 is mounted on the lens holder 1 so that the optical axis thereof is parallel to the journal 7 stated above. Further, a balance 8 is secured to the lens holder 1 on the side, which is opposite to the objective lens with respect to the journal 7. A pair of driving coils, one for focusing 4 and the other for tracking 3, are secured to the outer peripheral surface of the lens holder 1 at two symmetrical position, putting the journal 7 therebetween. The outer peripheral surface of the lens holder 1, to which the driving coil for focusing 4 and the driving coil for tracking 3 are secured, is a common continuous arc-shaped surface, whose center is at the journal 7. Each of the coils 4 and 3 is bent along the arc-shaped surface stated above and secured to the lens holder 1.

Figure 5:
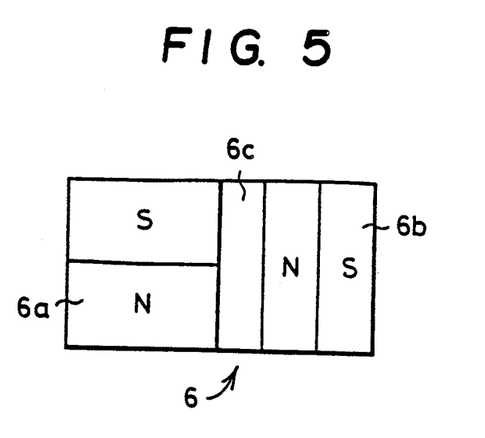
FIG. 5 is a front view of the magnetic in the embodiment stated above.
Figure 7:
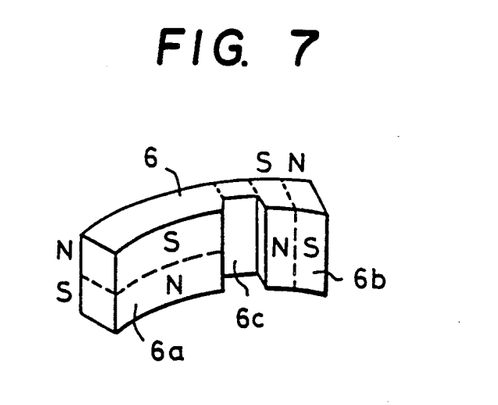
FIG. 7 is a perspective view of the magnetic stated above.
Figure 8:
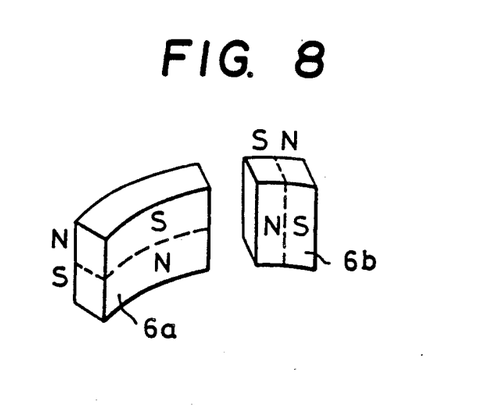
FIG. 8 is a perspective view illustrating a modification of the magnet.

The journal 7 is implanted on a central boss portion of the yoke 9. The two side portions of the yoke 9 are formed in a fan shape, putting the journal 7 therebetween. The outer peripheral portion of this fan shape is bent at a right angle, standing so as to be opposite to each of the coils 4 and 3. Each of these standing portions of the yoke 9 is formed along an arc, whose center is at the journal 7, and an arc-shaped magnet portions 6a, 6b are secured to the inner surface of these standing portions. The magnet portions 6a and 6b are formed in one body 6 by using e.g. resin binder, etc. As indicated in FIGS. 5 and 7, in the magnet 6, groove 6c is formed at the central portion thereof in the direction parallel to the journal 7 and the magnet 6 is divided into two magnet portions, one for focusing 6a and the other for tracking 6b, by thin groove 6c serving as a boundary. The magnet portion for focusing 6a is magnetized so as to be polarized so that the N pole and the S pole are arranged in this order in the direction of the journal 7, viewed from the coil side. On the other hand, the magnet portion for tracking 6b is magnetized so as to be polarized in the direction perpendicular to the magnetization direction of the magnet portion for focusing 6a stated above and in this way the N pole and the S pole are formed in the peripheral direction, viewed from the coil side. In this way, the magnet portions 6a and 6b are formed in one body to be arranged on a continuous common surface.

The groove 6c stated above constitutes the joint portion connecting the two magnet portions 6a and 6b described above. By the formation of this groove 6c, the portions, which are opposite to the driving coils 3 and 4, are more depressed than the effective magnet portions 6a and 6b stated above so that the gap g between the bottom of the groove and the driving coils 3, 4 is made wider.

Figure 6:
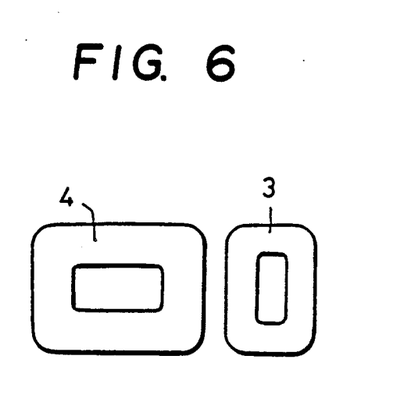
FIG. 6 is a front view of the coil in the embodiment stated above.

As indicated in FIG. 6, the driving coil for focusing 4 stated above is formed so as to be rectangular, longer in the horizontal direction and it is so located that the longer sides thereof are opposite to the poles of the magnet portion for focusing 6a. On the other hand, the driving coil for tracking 3 stated above is formed so as to be rectangular, longer in the vertical direction and it is so located that the longer sides thereof are opposite to the poles of the magnet portion for tracking 6b.

Another yoke 5 is secured to the yoke 9 stated above. The two side portions of the yoke 5 are formed also in the fan shape, putting the journal 7 therebetween. The outer peripheral portion of this fan shape is bent at a right angle to stand there. These standing portion are formed along an arc, whose center is at the journal 7. These standing portions traverse openings 1a formed in the lens holder 1 with a spatial margin and at the same time they are opposite to the magnetic portions 6a and 6b, putting the coils 4 and 3 therebetween, respectively.

Now, the operation of the embodiment described above will be explained, separately for the focusing drive and for tracking drive.

(1) Focusing drive

Figure 9:
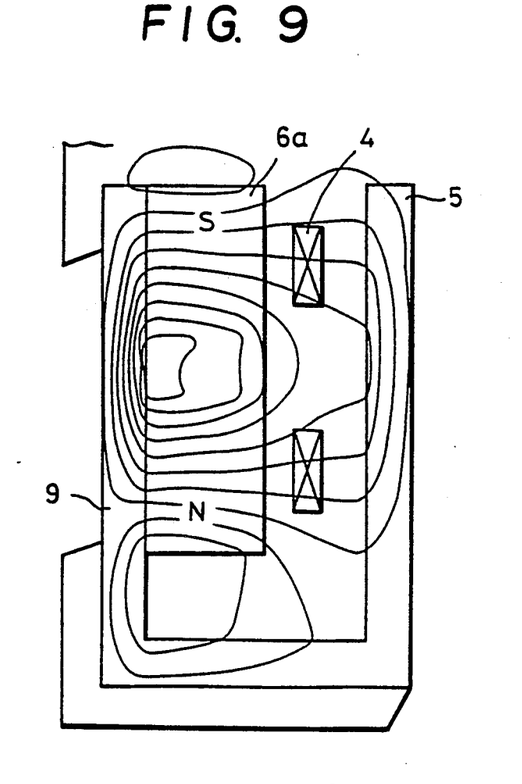
FIG. 9 is a scheme for explaining the aspect of the magnetic flux in the magnetic circuit for focusing in the embodiment stated above.

FIG. 9 shows the relation between the magnetic flux produced by the magnet portion for focusing 6a and the driving coil for focusing 4. When driving current is made to flow through the coil 4, the thrusting force is generated by this driving current and the magnetic flux within the magnetic circuit. This thrusting force is generated equally for the driving coil for focusing 4 arranged symmetrically with respect to the supporting journal 7. Thus the objective lens 2 is moved in the direction of the optical axis to effect the focusing operation together with the lens holder 1. The center of gravity of the movable part including the objective lens 2 is in accordance with the position of the supporting journal 7. For this reason, the movable part is moved in the direction of the optical axis, i.e. in the focusing direction, without being subjected to pivoting, irregular oscillations, etc.

(2) Tracking drive

Figure 10:
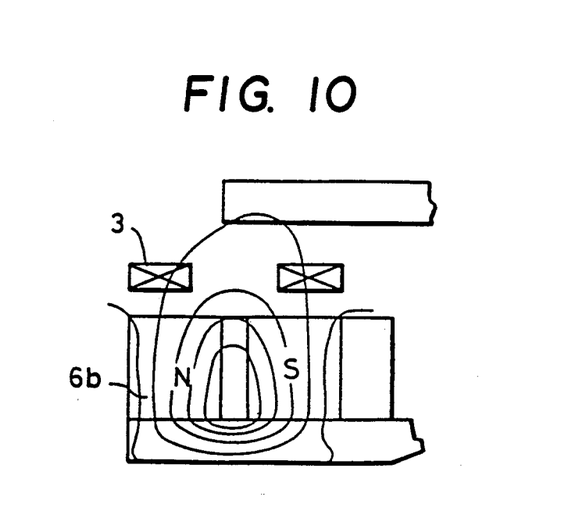
FIG. 10 is a scheme for explaining the aspect of the magnetic flux in the magnetic circuit for tracking in the embodiment stated above.

FIG. 10 shows the relation between the magnetic flux produced by the magnetization of the magnet portion for tracking 6a and the driving coil for tracking 3. When driving current flows through the coil 3, a thrusting force is produced by this driving current and the magnetic flux within the magnetic circuit. This thrusting force generates a rotational movement in the direction perpendicular to the driving coil for focusing 4 stated above, i.e. around the supporting journal 7. The tracking operation is effected by driving the lens holder 1 together with the objective lens in the tracking direction.

For the pair of the driving coil for focusing 4 and the driving coil for tracking 3 in the embodiment indicated in the figure, plane plate type coils having the same shapes, respectively, are used. This is a structure, which is simpler and easier to wind the coil than the hollow coil used in conventional examples and further a shape, which is the most appropriate for dealing with a high space factor type high performance coil such as a printed coil, a superposed coil, etc., or a low cost coil. Since the magnets opposite to the coils having the same shapes are magnetized in two directions perpendicular to each other, the thrusting forces generated in the coils are perpendicular to each other.

Figure 23E:
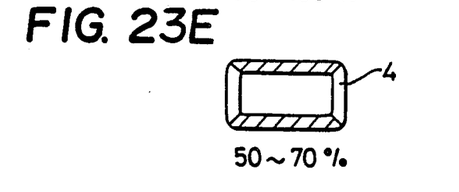

The shape of the coils and the magnetization pattern are determined by optimizing them, taking the drive sensitivity, the movable region, etc. required to the objective lens driving device into account, i.e. by regulating the size of the coils and the magnets and the ratio of the areas occupied by them. FIGS. 23E and 23e show the utilization efficiency of the driving coil for focusing and the driving coil for tracking in the embodiment described above, i.e. the ratio of the length of the part, on which the thrusting force acts effectively, with respect to the total length of the wire of the coils by hatching. As it can be seen clearly from FIGS. 23E and 23e, according to the embodiment indicated in the figures, it is possible to achieve a utilization efficiency identical to that of the objective lens driving device having a magnetic circuit for focusing and a magnetic circuit for tracking exclusively used, respectively, as explained, referring to FIGS. 21 and 22.

Further, since the driving coil for focusing and the driving coil for tracking are not wound, superposed on each other, but arranged on a continuous common surface, the space, where each of the coils is located, can be held to a small value. Therefore, it is possible to raise the magnetic flux density within this space by about 10 to 250% and to increase significantly the driving force.

Further, it is possible also to use the driving coil for focusing and the driving coil for tracking in common by making them have a same or analogous shape on a plane. In this way, the utilization in common of a fabrication installation is advanced and it is possible to intend cost down from this point of view.

For the magnet 6 stated above, the magnet portion for focusing 6a and the magnet portion for tracking 6b are formed in one body and the magnet portions 6a and 6b are magnetized so as to be polarized as described above. The portion on the side, which is opposite to the driving coils 3, 4 is more depressed than the effective magnet portions 6a and 6b by forming the groove 6c at the connecting portion between the magnet portions 6a and 6b so that the gap g between the bottom of the groove and the driving coil 3, 4 is widened. Since the intensity of the magnetization is proportional to the square of the distance measured from the magnetic pole of a magnetizing device, in the case where the magnet portions 6a and 6b are magnetized so as to be polarized, the magnetization of the groove 6c constituting the connecting portion stated above is suppressed to an extremely low value by widening the gap g stated above and thus interferences between the magnetic poles of the magnetic portions 6a and 6b are almost eliminated. Consequently, since the magnetic flux starting from the groove 6c is extremely weak and further the amount of the magnetic flux arriving at the driving coils 3 and 4 is remarkably reduced by the wide gap g stated above, influences of the magnetic flux starting from the groove 6c constituting the connecting portion stated above are almost eliminated, the thrusting force in an oblique direction with respect to the focusing direction and the tracking direction is at an almost negligible level, and thus stable focusing control and tracking control are possible.

Furthermore, since a prior art magnet was fabricated by a method, by which magnet material is at first sintered and then polished, etc., it was a factor raising the cost, when the shape was complicated. However, recently, since a magnet, called generally plastic magnet, fabricated by extrusion or compression can be used and characteristics of the magnet are improved, by using a sort of plastic magnet, as described above, it is possible to fabricate easily even a magnet having a relatively complicated shape such as a driving magnet of an actuator according to this invention.

According to the embodiment described above, the magnet portion 6a for generating the thrusting force in the focusing direction is basically approximately identical to the example indicated in FIG. 10 and a magnet for focusing 26a and a magnet for tracking 26b are unified through a non-magnetized connecting portion 26d as to obtain a single magnet 26.

Figure 14:
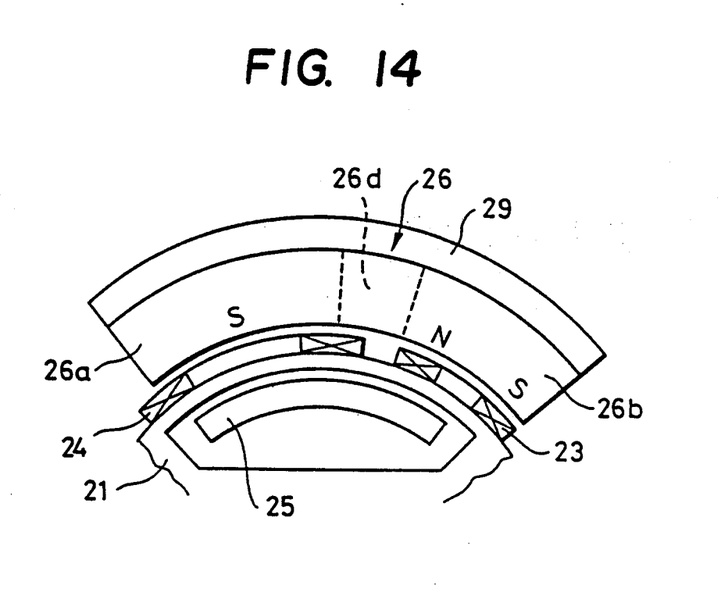
FIG. 14 is a plan view of the principal part showing an example of the objective lens driving device using a magnet at a fabrication step preceding the completion of this invention.
Figure 15:
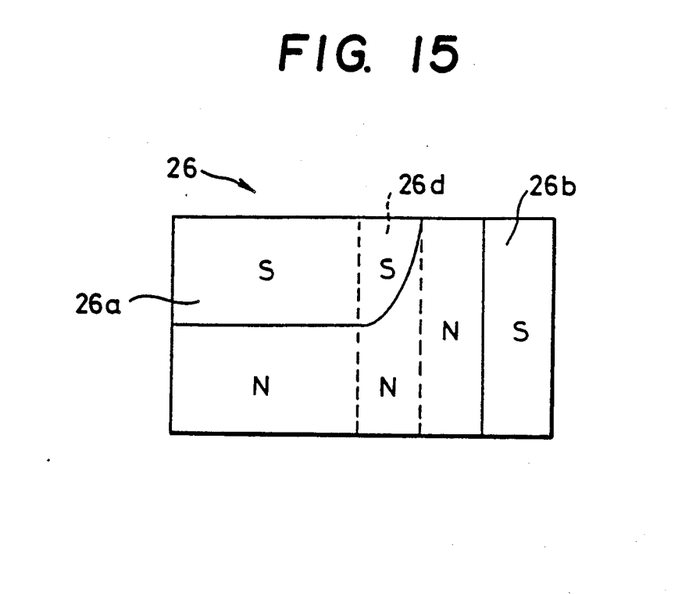
FIG. 15 is a front view of the magnet used in FIG. 12.

The thrusting force stated above in the oblique direction is produced, in the case where the magnet for focusing 26a and the magnet for tracking 26b are formed in one body, disposing a non-magnetized connecting portion 26d having the same thickness therebetween as indicated in FIG. 14. That is, when the magnet 26a and the magnet 26b are magnetized so as to be polarized, the connecting portion 26d is strongly magnetized. At the same time, mutual interference between the magnetic poles takes place and the connecting portion 26d has a magnetization pattern, in which the S and the N poles are separated by an arc-shaped bounding in an oblique direction, as indicated in FIG. 15. For this reason, the thrusting force in the oblique direction is generated by the influences of this magnetization pattern, but these influences can be removed by disposing the groove 6c.

A magnetic piece 10 is secured to the fan-shaped outer peripheral portion described above of the lens holder 3 at a position, which is opposite to the center of the magnetic pole of the magnet portion for focusing 6a. The magnet piece 10 is a member having a small width, which is long in the direction of the journal 7. It is so formed that the size x of the width in the peripheral direction of the circle, whose center is at the journal 7, is fairly smaller than the size in the peripheral direction of the magnet portion for focusing 6a, as indicated in FIGS. 11 and 12, and that the size y of the length in the direction of the journal 7 is smaller than the size of the magnet portion for focusing 6a.

Figure 11:
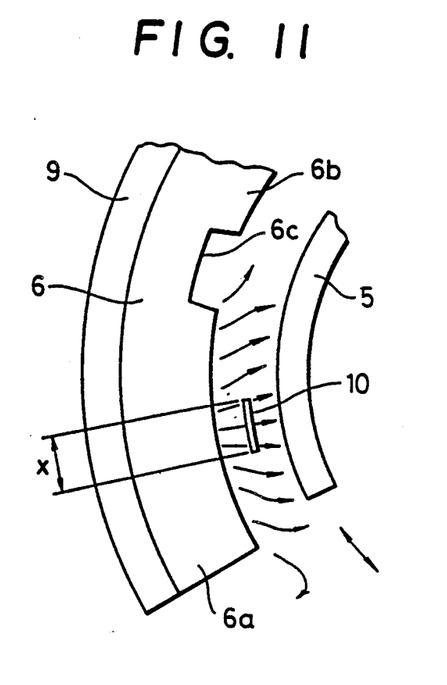
FIG. 11 is a plan view showing the aspect of the magnetic flux in the magnetic piece portion in an embodiment.
Figure 12:
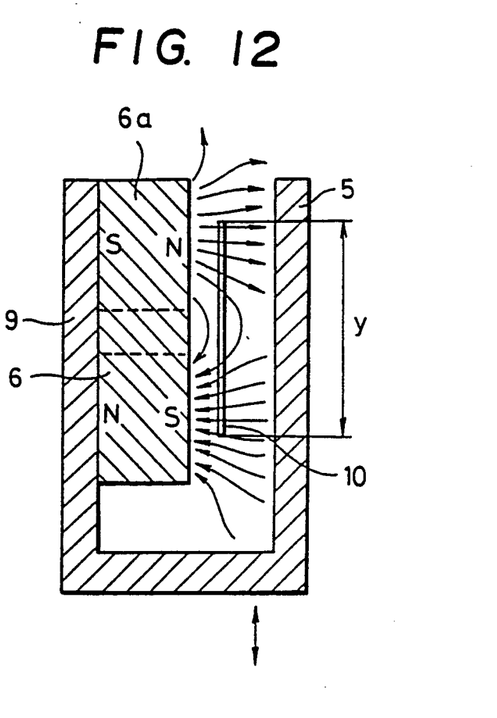
FIG. 12 is a longitudinal cross-sectional showing the aspect of the magnetic flux similarly in the magnetic piece portion.

FIGS. 11 and 12 show the relation between the magnetic flux produced by the magnetic portion for focusing 6a and the magnetic piece 10. The magnetic portion for focusing 6a is magnetized so as to be polarized in the direction of the journal 7. As indicated in FIG. 11, in a plane perpendicular to the journal 7, the magnetic flux density is maximum at the central portion in the peripheral direction within the gap and decreases with decreasing distance from the two extremities of the gap. Since the magnetic piece 10 is disposed within the gap, a magnetic attractive force by the magnetic portion for focusing 6a acts on the magnetic piece 10 and at the same time a restoring force acts thereon, which is approximately equal to the elastic restoring force so that the magnetic piece has a tendency to be stably held at the maximum point of the magnetic flux stated above. The lens holder 1 is held at the neutral point in the peripheral direction by this restoring force and in this way the objective lens 2 is held at the neutral point in the tracking direction. The restoring force described above is proportional to the gradient of the magnetic flux distribution and the area of the magnetic piece 10. Since the gradient stated above in the magnetic flux density varies approximately linearly in the usual movable region of the objective lens 2 in the tracking direction, the restoring force can be obtained approximately uniformly in the usual movable region of the objective lens 2.

On the other hand, as indicated in FIG. 12, in the cross-section of the magnet portion for focusing 6a, since the magnet portion 6a stated above is magnetized so as to be polarized in the direction of the journal 7, the gradient in the magnetic flux density in the gap, in which the magnetic piece 10 is located, is reversed at the central portion in the up and down direction. Here the magnetic piece 10 described above acts as a part of the magnetic path and is attracted to the central portion of the polarized magnetization. This attractive force acts as the restoring force and the lens holder 1 is held at a predetermined position in the direction of the journal 7. In this way, the objective lens 2 is held at the neutral point in the focusing direction. Further, since the magnetic piece 10 acts as the magnetic path of the magnetic flux starting from the magnetic portion 6a, the magnetic flux density is increased so as to contribute to the increase in the sensitivity of the objective lens driving device and at the same time it is possible to obtain stably the magnetic restoring force in a wide range.

Figure 13:
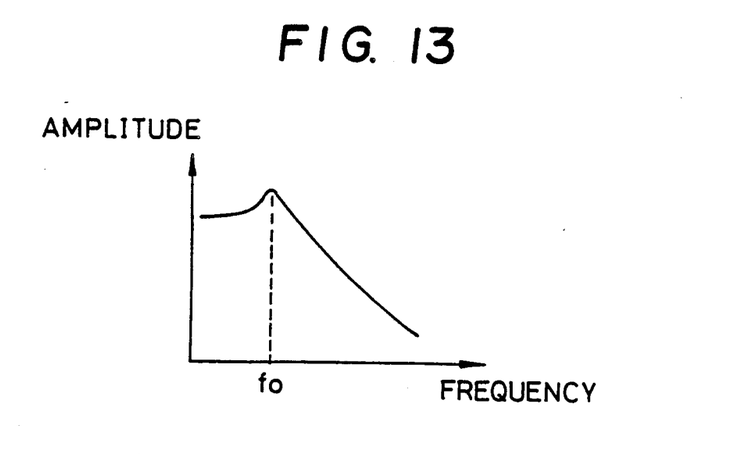
FIG. 13 indicates a characteristic curve showing an example of the first order resonance frequency of the movable part.

The restoring force is as important as the spring constant as parameters determining the first order resonance frequency $f_0$ (cf. FIG. 13) of the movable part in the objective lens driving device. Usually $f_0$ is set so as to be somewhat higher than the rotational frequency of the disk. It is extremely important for improving the efficiency and the characteristics of the objective lens driving device to optimize these constants. This is true both for the focusing and for the tracking. The magnetic restoring forced stated above is selected so as to optimize $f_0$ both for the focusing direction and for the tracking direction by choosing the width x, the length y and the thickness t of the magnetic piece 10.

Figure 1:
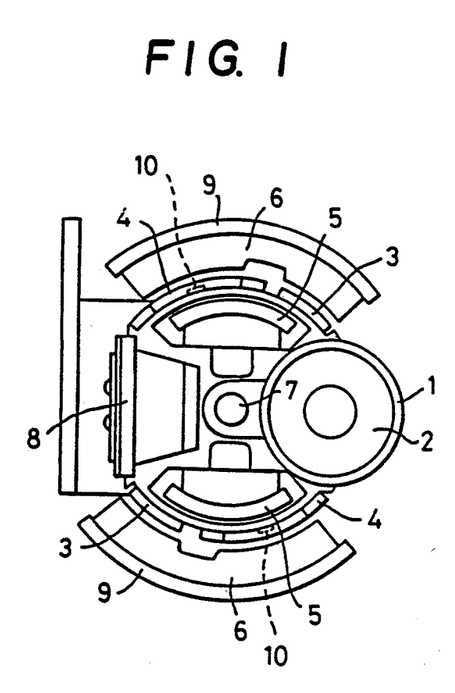
FIG. 1 is a plan view illustrating an embodiment of the objective lens driving device according to this invention.
Figure 2:
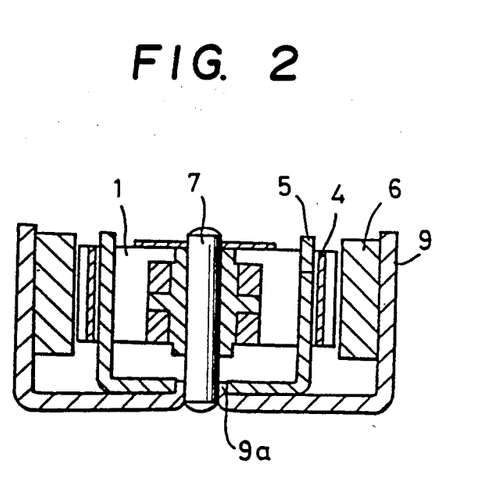
FIG. 2 is a longitudinal cross-sectional view of the embodiment indicated in FIG. 1.
Figure 3:
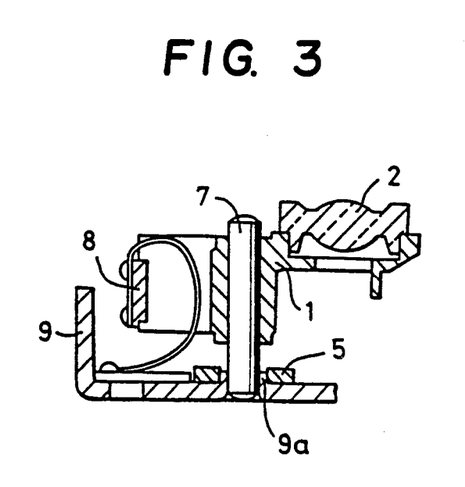
FIG. 3 is a longitudinal cross-sectional view of the objective lens portion in the embodiment stated above.
Figure 4:
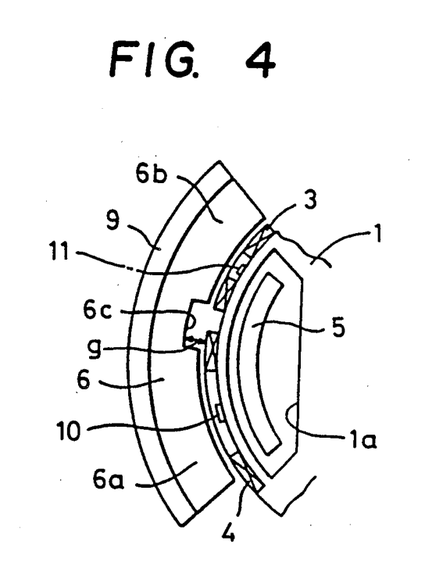
FIG. 4 is an enlarged plan view of the magnet and coil portion in the embodiment stated above.

In the magnetic circuits in a usual objective lens driving device the restoring force in the focusing direction indicated in FIG. 12 is greater than the restoring force in the tracking force indicated in FIG. 11 and further the region of the restoring force is wider for the focusing direction than for the tracking direction. For this reason, the embodiment indicated in the figures, in which the magnetic piece 10 is located on the focusing side, where the movable part is slid, is more reasonable for characteristics of existing disk devices such as compact disk players, video disk players, etc. However, for other special disks, other use, etc., according to the requirement of these characteristics the magnetic piece may be located on the tracking side, i.e. on the side, which is opposite to the magnet portion for tracking 6b. Reference numeral 11 in FIG. 4 shows an example of the magnetic piece in the case where it is located on the tracking side.

According to this invention, since it is possible to realize the magnetization of the magnet separately for the focusing and for tracking, for each of which an exclusive magnetic circuit can be used, and further since the magnet portions as well as the driving coils for focusing and for tracking, which are opposite thereto, are arranged on a respective common surface, the magnetic gap, in which the coils are located, can be reduced and thus a high density magnetic flux can be obtained. Consequently it is possible to provide an objective lens driving device having a high efficiency. Furthermore, since it is possible to design each of the magnet portion for focusing and for tracking, the magnetic circuits and the coils therefor as parts exclusively used therefor, it is easy to optimize the characteristics thereof.

Further, according to this invention, since a magnet portion for generating the driving force in one direction and another magnet for generating the driving force in another direction are formed in one body and at the same time the portion connecting these magnet portions is depressed from the side, which is opposite to the driving coils, so that the gap between the driving coils and the bottom of the depression is widened, it is possible to eliminate interferences between the magnet poles of the effective magnetic portions adjacent to each other, while intending to reduce the number of parts by forming the two effective magnet portions in one body, and thus to lower the cost. In this way, it is possible to make the actuator effect a stable operation.

Still further, according to this invention, since the restoring force for holding the objective lens at the neutral point is obtained magnetically and neither plate spring nor molded rubber is used, neither it depends on temperature characteristics nor it varies with the passage of time. Consequently the range, for which the restoring force is linear, is wide and it is possible to follow-up stably even disks having surface oscillation or a large excentricity. Furthermore, since the restoring force can be obtained in two directions, i.e. focusing direction and tracking direction, by means of one or one set of magnetic pieces, this invention can provide a small and light objective lens driving device. At the same time, since it can be composed of a small numbers of parts, it can provide a low cost and high reliability objective lens driving device.

What is claimed is:

1. An objective lens driving device comprising:
    a magnet for focusing and a magnet for tracking which are magnetized so as to be polarized in respective directions perpendicular to each other, and which are arranged on a continuous common surface; and
    a driving coil for focusing and a driving coil for tracking, which are arranged on a common surface so as to be respectively facing said magnet for focusing and said magnet for tracking;
    wherein an objective lens having an optical axis is moved in a first direction parallel to said optical axis by a thrusting force generated between said magnet for focusing and said driving coil for focusing and is moved in a second direction perpendicular to said optical axis by a thrusting force generated between said magnet for tracking and said driving coil for tracking, said magnet for focusing and said magnet for tracking being respective portions of a single body, wherein a portion of said body which connects said magnets is, on a side of said body facing said driving coils, more depressed than said portions which act effectively as said magnet for focusing and said magnet for tracking.

2. An objective lens driving device according to claim 1, wherein said continuous common surface on which said magnets for focusing and tracking are arranged and said common surface on which said driving coils for focusing and tracking are arranged are arcuate surfaces on respective concentric cylindrical wall portions which each have a center at a fixed journal.

3. An objective lens driving device according to claim 1, wherein said body is arcuate.

4. An objective lens driving device according to claim 1, wherein a lens holder, on which said objective lens is mounted, is supported rotatably on a fixed journal extending parallel to the optical axis of the lens and is movable along said fixed journal in the direction of the optical axis, and including a further magnet for focusing, a further magnet for tracking, a further driving coil for focusing and a further driving coil for tracking which are arranged on an opposite side of said fixed journal from said first-mentioned magnet for focusing, magnet for tracking, driving coil for focusing, and driving coil for tracking, respectively.

5. An objective lens driving device according to claim 1, including a movable lens holder having said lens and said coils thereon, including a magnetic piece secured to said lens holder at a position opposite to the center of a magnetic pole of said magnet for focusing, wherein said objective lens is urged toward a neutral position by a two-dimensional restoring force which is the magnetic attractive force acting on said magnetic piece.

6. An objective lens driving device according to claim 5, wherein the shape of said magnetic piece is rectangular, said magnetic piece having a size which is significantly smaller than the size of said magnet for focusing in said second direction and is slightly smaller than the size of said magnet for focusing in said first direction.

7. An objective lens driving device according to claim 1, including a movable lens holder having said lens and said coils thereon, including a magnetic piece secured to said lens holder at a position opposite to the center of a magnetic pole of said magnet for tracking, wherein said objective lens is urged toward a neutral position by a two-dimensional restoring force which is the magnetic attractive force acting on said magnetic piece.

8. An objective lens driving device according to claim 1, wherein a lens holder, on which said objective lens is mounted, is supported rotatably on a fixed journal extending parallel to the optical axis of the lens and is movable along said fixed journal in the direction of the optical axis, and including a further magnet for focusing, a further magnet for tracking, a further driving coil for focusing and a further driving coil for tracking which are arranged on an opposite side of said fixed journal from said first-mentioned magnet for focusing, magnet for tracking, driving coil for focusing, and driving coil for tracking, respectively, an outer peripheral surface of said lens holder being a continuous arcuate surface which is said common surface and has a center at said fixed journal, and wherein said driving coil for focusing and said driving coil for tracking each extend along said common surface and are secured thereto.

9. An objective lens driving device comprising:
a magnet for focusing and a magnet for tracking which are magnetized so as to be polarized in two directions perpendicular to each other, and which are arranged on a continuous common surface; and
a driving coil for focusing and a driving coil for tracking which are arranged on a common surface so as to be respectively facing said magnet for focusing and said magnet for tracking;
wherein an objective lens having an optical axis is moved in a first direction parallel to said optical axis by a thrusting force generated between said magnet for focusing and said driving coil for focusing and is moved in a second direction perpendicular to said optical axis by a thrusting force generated between said magnet for tracking and said driving coil for tracking, said magnet for focusing and said magnet for tracking being separate magnets.

10. An objective lens driving device according to claim 9, wherein said continuous common surface on which said magnets for focusing and tracking are arranged and said common surface on which said driving coils for focusing and tracking are arranged are arcuate surfaces on respective concentric cylindrical wall portions each having a center at a fixed journal.

11. An objective lens driving device according to claim 9, wherein a lens holder, on which said objective lens is mounted, is supported rotatably on a fixed journal extending parallel to the optical axis of the lens and is movable along said fixed journal in the direction of the optical axis, and including a further magnet for focusing, a further magnet for tracking, a further driving coil for focusing, and a further driving coil for tracking are arranged on an opposite side of said fixed journal from said first-mentioned magnet for focusing, magnet for tracking, driving coil for focusing and driving coil for tracking, respectively.

12. An objective lens driving device according to claim 9, including a movable lens holder having said lens and said coils thereon, including a magnetic piece secured to said lens holder at a position opposite to the center of a magnetic pole of said magnet for focusing, wherein said objective lens is urged toward a neutral position by a two-dimensional restoring force which is the magnetic attractive force acting on said magnetic piece.

13. An objective lens driving device according to claim 12, wherein the shape of said magnetic piece is rectangular, said magnetic piece having a size which is significantly smaller than the size of said magnet for focusing in said second direction and is slightly smaller than the size of said magnet for focusing in said first direction.

14. An objective lens driving device according to claim 9, including a movable holder having said lens and said coils thereon, including a magnetic piece secured to said lens holder at a position opposite to the center of a magnetic pole of said magnet for tracking, wherein said objective lens is urged toward a neutral position by a two-dimensional restoring force which is the magnetic attractive force acting on said magnetic piece.

15. An objective lens device according to claim 9, wherein a lens holder, on which said objective lens is mounted, is supported rotatably on a fixed journal and is movable along said fixed journal in the direction of the optical axis, and including a further magnet for focusing, a further magnet for tracking, a further driving coil for focusing, and a further driving coil for tracking which are arranged on an opposite side of said fixed journal from said first-mentioned magnet for focusing, magnet for tracking, driving coil for focusing, and driving coil for tracking respectively, an outer peripheral surface of said lens holder being a continuous arcuate surface which is said common surface and a has center at said fixed journal, wherein said driving coil for focusing and said driving coil for tracking each extend along said common surface and are secured thereto.

16. An apparatus comprising: first and second members having thereon respective first and second continuous surfaces which face each other, said first member having thereon an objective lens which has an optical axis, and said first member being movable relative to said second member; a focusing magnet portion and a tracking magnet portion which are separated by a gap and are provided on one of said first and second surfaces, and a focusing driving coil and a tracking driving coil which are spaced and are provided on the other of said first and second surfaces in alignment with said focusing and tracking magnet portions, respectively; said magnet portions being magnetized so as to be polarized in respective directions which are perpendicular to each other; wherein said first member is moved in a first direction parallel to said optical axis of said lens by a thrusting force generated between said focusing magnet portion and said focusing driving coil when said focusing driving coil is energized, and is moved in a second direction perpendicular to said optical axis by a thrusting force generated between said tracking magnet portion and said tracking driving coil when said tracking driving coil is energized.

17. An apparatus as recited in claim 16, wherein said focusing magnet portion and said tracking magnet portion are physically separate parts.

18. An apparatus as recited in claim 16, including a single integral magnet body, said focusing magnet portion and said tracking magnet portion being respective spaced parts of said magnet body, said magnet body having on a side thereof facing said coils at a location between said magnet portions a depression which serves as said gap.

* * * * *